(12) United States Patent
Patel et al.

(10) Patent No.: US 8,977,123 B2
(45) Date of Patent: Mar. 10, 2015

(54) 2-STEP-OPTIMIZATION PROCEDURE FOR ROUTING AND WAVELENGTH ASSIGNMENT WITH COMBINED DEDICATED SHARED PROTECTIONS IN MULTI-CABLE MULTI-FIBER OPTICAL WDM NETWORKS

(75) Inventors: Ankitkumar N. Patel, East Brunswick, NJ (US); Philip Nan Ji, Plainsboro, NJ (US); Yoshiaki Aono, Tokyo (JP); Daisuke Taniguchi, Tokyo (JP)

(73) Assignee: NEC Laboratories America, Inc., Princeton, NJ (US)

(*) Notice: Subject to any disclaimer, the term of this patent is extended or adjusted under 35 U.S.C. 154(b) by 48 days.

(21) Appl. No.: 13/588,403

(22) Filed: Aug. 17, 2012

(65) Prior Publication Data

US 2013/0216225 A1    Aug. 22, 2013

Related U.S. Application Data

(60) Provisional application No. 61/524,342, filed on Aug. 17, 2011.

(51) Int. Cl.
*H04J 14/00* (2006.01)
*H04Q 11/00* (2006.01)
*H04J 14/02* (2006.01)

(52) U.S. Cl.
CPC .......... *H04Q 11/0005* (2013.01); *H04J 14/021* (2013.01); *H04J 14/0257* (2013.01); *H04J 14/0267* (2013.01); *H04J 14/0294* (2013.01); *H04J 14/0295* (2013.01)
USPC .............................................. 398/49; 398/57

(58) Field of Classification Search
CPC . H04J 14/021; H04J 14/0257; H04J 14/0267; H04J 14/0294; H04J 14/0295; H04J 14/0227; H04J 14/0241; H04J 14/0284; H04Q 11/0005
USPC ........................................................ 398/57, 49
See application file for complete search history.

(56) References Cited

U.S. PATENT DOCUMENTS

| | | | |
|---|---|---|---|
| 6,735,393 B1 * | 5/2004 | Zouganeli | 398/48 |
| 6,829,216 B1 * | 12/2004 | Nakata | 370/228 |
| 7,218,851 B1 * | 5/2007 | Zang | 398/33 |
| 7,224,897 B1 * | 5/2007 | Slezak et al. | 398/5 |
| 7,283,741 B2 * | 10/2007 | Sadananda | 398/5 |
| 7,298,704 B2 * | 11/2007 | Kodialam et al. | 370/238 |
| 7,301,911 B2 * | 11/2007 | Mack-Crane et al. | 370/254 |
| 7,308,198 B1 * | 12/2007 | Chudak et al. | 398/58 |
| 7,627,243 B2 * | 12/2009 | Sadananda | 398/7 |
| 7,639,944 B2 * | 12/2009 | Wang | 398/3 |
| 7,689,120 B2 * | 3/2010 | Hoang et al. | 398/57 |
| 7,697,455 B2 * | 4/2010 | Sadanada | 370/254 |
| 7,821,946 B2 * | 10/2010 | Mack-Crane et al. | 370/238 |
| 7,848,651 B2 * | 12/2010 | Hoang et al. | 398/57 |
| 7,860,392 B2 * | 12/2010 | Hoang et al. | 398/57 |
| 7,889,675 B2 * | 2/2011 | Mack-Crane et al. | 370/254 |
| 7,903,970 B2 * | 3/2011 | Liu et al. | 398/57 |

(Continued)

*Primary Examiner* — Ken Vanderpuye
*Assistant Examiner* — Abbas H Alagheband
(74) *Attorney, Agent, or Firm* — Joseph Kolodka

(57) ABSTRACT

The inventive 2-step-optimization procedure that addresses the generalized routing and wavelength assignment problem with variable number of combined 1+1 dedicated and shared connections for the first time. The proposed procedure results a solution in time that is polynomial of the input size. Thus, the time complexity of the 2-step-optimization procedure is significantly less than that of existing methods.

6 Claims, 4 Drawing Sheets

(a) 6-node network      (b) Layered Graph

(56) References Cited

U.S. PATENT DOCUMENTS

| | | | |
|---|---|---|---|
| 8,125,891 B2* | 2/2012 | Mack-Crane et al. | 370/216 |
| 8,144,626 B2* | 3/2012 | Zhang et al. | 370/255 |
| 8,233,397 B1* | 7/2012 | Bhandari | 370/237 |
| 8,244,127 B2* | 8/2012 | Sadananda et al. | 398/29 |
| 8,346,965 B2* | 1/2013 | Zhang et al. | 709/241 |
| 8,737,836 B2* | 5/2014 | Shimizu | 398/58 |
| 8,744,262 B2* | 6/2014 | Barnard | 398/49 |
| 2002/0080435 A1* | 6/2002 | Lu et al. | 359/109 |
| 2005/0069314 A1* | 3/2005 | De Patre et al. | 398/5 |
| 2010/0074623 A1* | 3/2010 | Skoog et al. | 398/79 |
| 2012/0117269 A1* | 5/2012 | Zhang et al. | 709/241 |
| 2012/0301143 A1* | 11/2012 | Shimizu | 398/49 |
| 2013/0266316 A1* | 10/2013 | Xia et al. | 398/48 |

* cited by examiner

2-STEP-OPTIMIZATION PROCEDURE FOR ROUTING AND WAVELENGTH ASSIGNMENT WITH COMBINED DEDICATED SHARED PROTECTIONS IN MULTI-CABLE MULTI-FIBER OPTICAL WDM NETWORKS

RELATED APPLICATION INFORMATION

This application claims priority to provisional application No. 61/524,342 filed Aug. 17, 2011, the contents thereof are incorporated herein by reference

BACKGROUND OF THE INVENTION

The present invention relates generally to optical communications, and more particularly to a 2-step-optimization procedure for routing and wavelength assignment with combined dedicated shared protections in multi-cable multi-fiber optical WDM networks.

With advance modulation schemes, each channel in optical WDM networks can support several hundred gigabits or more per second data rate. Any failure in such high capacity networks can cause large amounts of data and revenue losses. Thus, in order to meet the service level agreement to end users, provisioning survivability is an essential requirement in optical WDM networks. Failure of an optical channel is mainly caused by either a transponder failure or a fiber cable cut. Survivability to a transponder failure can be provisioned by deploying redundant transponders that are referred to as backup transponders at end nodes. Survivability to a fiber cable cut can be provisioned by allocating redundant channel resources along fiber cable-disjoint routes, where one of the routes is referred to as a working route and the others are referred to as backup routes. In order to minimize the channel switching time in case of a failure, data can simultaneously be transferred on both working and backup routes by allocating dedicated resources. Such protection mechanism is referred to as the 1+1 dedicated protection. While provisioning survivability through 1+1 dedicated protection, the required number of wavelengths in the network is increased by at least the factor of the number of 1+1 dedicated protection routes requested by a traffic demand, and that cannot be used to support other network traffic. Thus, as the requested number of 1+1 dedicated protection routes increases, survivability of the traffic demand increases; however, the wavelength utilization decreases.

It is noted here that the term "fiber cable" (or simply "cable") refers to the physical bundle of fibers within the same assembly, this is also called "fiber trunk" sometimes. Each cable can contain multiple optical fibers or just a single optical fiber. If they are n fibers between two optical network nodes, these fibers can be contained within the same fiber cable, or they can be distributed among n cables containing 1 fiber each, or they can be distributed among m cables where 1≤m≤n. Once a fiber cable is cut, all the fibers contained within the cable are disconnected, but other cables might not be affected.

Wavelength resource utilization can be improved if backup wavelengths along backup routes can be shared among multiple working connections that are routed on fiber cable-disjoint routes. Such protection mechanism is referred to as shared protection. Contrarily, the connection switching time in the shared protection mechanism is increased by the port switching time and signal propagation time between end users than that of the 1+1 dedicated protection mechanism.

The survivability of time-critical applications can be increased in an efficient manner by provisioning a traffic demand with combined 1+1 dedicated and shared protections. The survivability of a traffic demand is improved exponentially with the number of total protection routes and the number of transponders, given the assumption that a failure of each fiber cable and a failure of each transponder are independent. For this invention, applicants investigate an efficient method that addresses the routing and wavelength assignment problem that provisions survivability through combined dedicated and shared protection mechanism in multi-cable multi-fiber optical WDM networks for the first time. The problem is defined as follows.

We are given a network topology G(V, E), where V is a set of nodes and E is a set of edges. Nodes i and j are connected through $F_{ij}$ number of fiber cables. Let $f_{ij}^p$ denotes the number of fibers confined within $p^{th}$ fiber cable connecting nodes i and j. We need to establish a set of traffic demands A in the network, where a traffic demand R(s, d, x, y) is requesting a working live-connection, x number of 1+1 dedicated backup live-connections, and y number of shared backup connections between source s and destination d. For each traffic demand, x+1 number of dedicated transponders are provisioned at end nodes to support working and x number of 1+1 dedicated live-connections. The released transponder due to any failure of a live-connection can be used to establish a new backup live-connection along one of the shared backup connections. Thus, in case of failures of l live-connections, if l≤y, the network can guarantee x+1 number of live-connections for a given traffic demand, otherwise, the network can support (x+1+y−l) number of live-connections. We need to find working, 1+1 dedicated backup, and shared connections, routing of these connections over physical topology, and operating wavelength of each connection such that wavelength utilization of the network is maximized. The network is transparent, and does not have traffic grooming or wavelength conversion capabilities. We refer to this problem as routing and wavelength assignment with combined dedicated and shared protections in multi-cable multi-fiber optical WDM networks.

It is noted that a "connection" represents the reserved wavelength resources along the route. A "live-connection" represents a connection with live data transfers. A wavelength in a fiber cable is referred to as a wavelength link.

So far, there is no existing solution for the routing and wavelength assignment problem with variable number of 1+1 dedicated and shared connections in multi-cable multi-fiber WDM networks. Applicants are the first to propose an efficient procedure to solve it.

If one restricts x=0 and y=0, the problem is transformed into the conventional routing and wavelength assignment problem in multi-fiber WDM networks. When x=1 and y=0, the problem is transformed into routing and wavelength assignment with 1+1 dedicated path protection. On the other hand, when x=0, and y=1, the problem is transformed into routing and wavelength assignment with shared path protection.

In another work, there was proposed a routing and wavelength assignment procedure when x=1 and y=1. The addressed problem has an additional constraint that was found working, 1+1 dedicated, and shared connections must be not only link-disjoint but also node-disjoint. In another prior work, the authors propose routing and wavelength assignment procedure when x=2, y=0, and x=0, y=2. In both these prior works, the problem was formulated using an Integer Linear Programming (ILP). The required time to solve the problem using the proposed methods increases exponentially with the input size, and thus, the proposed ILP formulations are not realistic approaches to address the problem in real time.

So far, the above mentioned prior works address the specific sub-problems of the problem addresses. Furthermore, the proposed solutions address only the case when each fiber is confined within a separate fiber cable, and do not applicable for the any other distribution of fibers within fiber cables.

Accordingly, there is a need for a 2-step-optimization procedure for routing and wavelength assignment with combined dedicated shared protections in multi-cable multi-fiber optical WDM networks.

BRIEF SUMMARY OF THE INVENTION

The present invention is directed to a 2-step-optimization method for finding a routing and wavelength assignment for a given set of traffic demands requiring variable number of dedicated and shared protections includes: modifying a layered graph for balancing a communications in a network; modifying Bhandri's procedure for finding K number of x+y+1 number of routes in the network; assigning wavelengths along shared routes such that sharing of wavelengths is maximized; searching K potential solutions for routing and wavelength assignment; selecting one of the solutions requiring a minimum number of new wavelength links; addressing routing and wavelength assignment sub-problems; and modifying Bhandari's procedure to find link-disjoint routes in the layered graph.

These and other advantages of the invention will be apparent to those of ordinary skill in the art by reference to the following detailed description and the accompanying drawings.

DETAILED DESCRIPTION

The present invention is directed to a 2-step-optimization procedure for the first time to address the routing and wavelength assignment problem with combined dedicated and shared protections in multi-cable multi-fiber WDM networks. The inventive 2-step-optimization procedure that addresses the generalized routing and wavelength assignment problem with variable number of combined 1+1 dedicated and shared connections for the first time. The proposed procedure results a solution in time that is polynomial of the input size. Thus, the time complexity of the 2-step-optimization procedure is significantly less than that of existing methods.

In the 2-step-optimization procedure, the routing and wavelength assignment sub-problems are addressed sequentially using a layered graph-based approach. Let, $G(V, E)$ denotes a given physical topology, where V is a set of vertices and E is a set of edges. $F_{ij}$ denotes the number of fiber cables connecting vertices i and j, and $f_{ij}^p$ denotes the number of fibers confined within fiber cable p connecting nodes i and j. Each fiber cable between nodes i and j is assigned a unique identification p, where $1 \leq p \leq F_{ij}$, and each fiber within a fiber cable p connecting nodes i and j is assigned a unique identification q, where $1 \leq q \leq f_{ij}^p$. We are given a set of traffic demands A in which a traffic demand R(s, d, x, y) requests a survivable connection between source s and destination d with x number of 1+1 dedicated connections and y number of shared connections. Each request is identified by a unique identification r, where $1 \leq r \leq |A|$. End nodes are equipped with x number of dedicated transponders to provide survivability against transponder failures.

Figure 1:
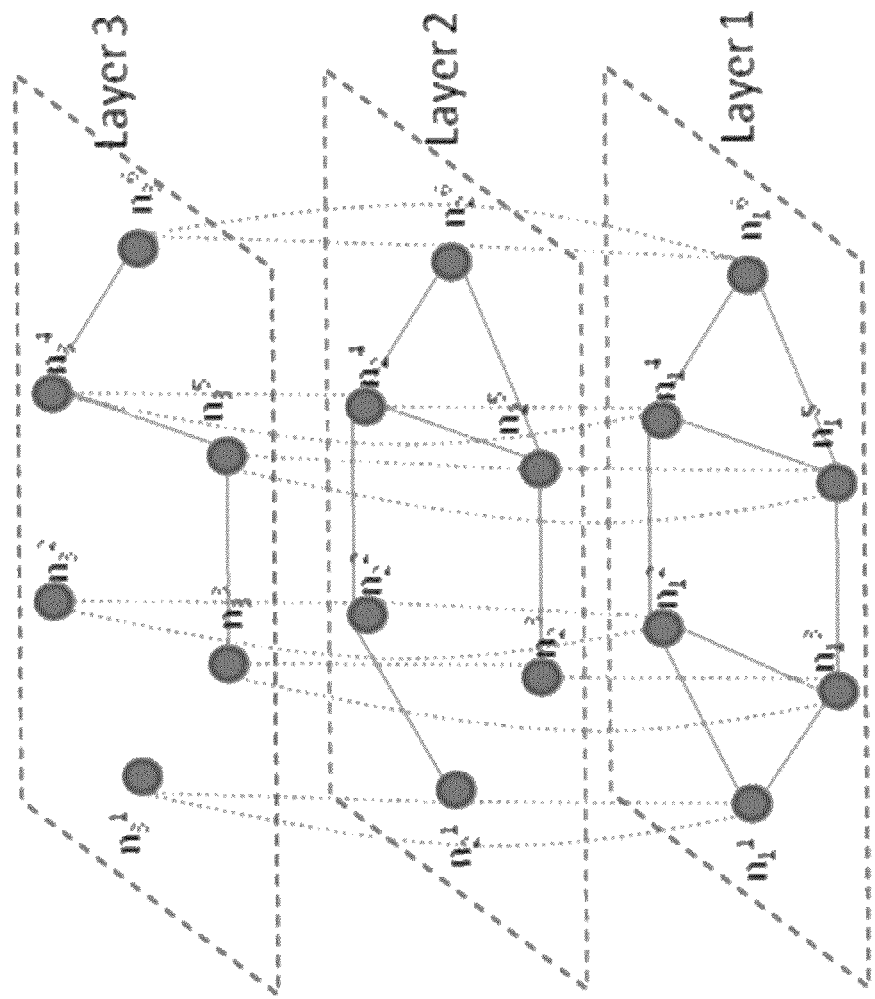
FIGS. 1($a$) and 1($b$) show an exemplary 6-node network and its corresponding layered graph, respectively.
Figure 1:
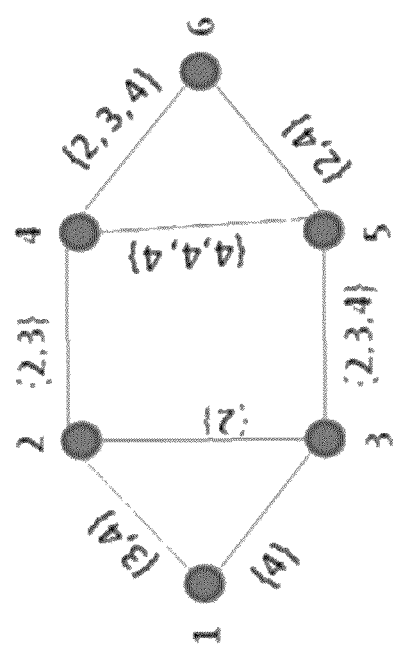

First, we construct a layered graph G'(N, L), where N is a set of nodes and L is a set of links. In the layered graph G', the given graph G is replicated for $\max_{(i, j) \in E} F_{ij}$ number of times, and each replication is identified by a layer l, where $1 \leq l \leq \max_{(i, j) \in E} F_{ij}$. A set of nodes in the $l^{th}$ layer is denoted as $N_l$, where $|N_l|=|V|$, $U_l N_l = N$, and a node i in the $l^{th}$ layer is denoted as $n_l^i$. Node $n_l^i$ with $n_m^i$ are connected, $\forall$ l, m, where $1 \leq l, m \leq \max_{(i, j) \in E} F_{ij}$. A link $(n_l^i, n_m^i)$, $\forall$ l, m, is referred to as a virtual link. An $i^{th}$ vertex in the given graph G is represented by a set of nodes $\{n_l^i | \forall l\}$ which is referred as a virtual node. Links connecting nodes $n_l^i$ to $n_l^j$ are removed at all layers with ID l that is greater than $F_{ij}$. Thus, the number of times, nodes $n_l^i$ and $n_l^j$, $\forall$ l, are connected in the layered graph, is equivalent to the number of fiber cables connecting nodes i and j in the given physical topology G, and a link connecting nodes $n_l^i$ and $n_l^j$ represents a fiber cable with ID l connecting nodes i and j in the given graph. The link $(n_l^i, n_l^j)$, $\forall$ l, in the layered graph is referred to as a fiber cable link. FIG. 1 ($a$) shows a layered graph for 6-node network topology for further clarifications. A set of integers on each edge represents the number of fiber cables and the number of fibers within each fiber cable. The size of a set represents the number of fiber cables $F_{ij}$ connecting a pair of vertices i and j, and the $p^{th}$ element of a set represents the number of fibers $f_{ij}^p$ confined within $p^{th}$ fiber cable. The corresponding layered graph is illustrated in FIG. 1($b$) in which the number of fiber cable links between a pair of virtual nodes is equivalent to the number of fiber cables (the size of a set) between a pair of vertices.

A given set of traffic demands, A, are arranged into descending order of their minimum hop distance. Routing and wavelength assignment sub-problems are addressed jointly for each request one-by-one by modifying the constructed layered graph. For the selected request r the process finds K potential routing and wavelength assignment solutions as follows.

The process first modifies the layered graph by allocating a very negligible cost to all virtual links connecting $n_l^i$ and $n_m^i$, for l, m, where $1 \leq l, m \leq \max_{(i, j) \in E} F_{ij}$. The cost assigned to a fiber cable link $(n_l^i, n_l^j)$, $\forall$ l, is proportional to the wavelength utilization of the fiber cable. Wavelength utilization of a fiber cable is defined as the ratio of the total used wavelengths in all fibers confined within the fiber cable to the total number of offered wavelengths in all fibers confined within the fiber cable. This cost assignment approach balances the traffic load over the network.

The process finds K-shortest routes in the modified layered graph using the procedure proposed in, and records the found routes in sets $I_k$, where $1 \leq k \leq K$. The found routes are not necessarily link-disjoint. The procedure considers each route $I_k$ as an input to the modified Bhandari's procedure, presented in FIG. 3 in which $P_m$ denoted an $m^{th}$ route, where $1 \leq m \leq x+y+1$), and finds x+y+1 number of fiber cable link disjoint routes. The modified Bhandari's procedure guarantees to find x+y+1 number of routes with minimum cost. Among the found routes, the shortest route is considered as a working route, and recorded as $k^{th}$ solution of a request r in a set $W_r^k$. The next subsequent x shortest routes are recorded as $k^{th}$ solution of a request r in sets $B_r^{km}$, and the next subsequent y routes are recorded as $k^{th}$ solution of a request r in sets $S_r^{km}$.

Once x+y+1 number of fiber cable link disjoint routes are found, the procedure finds the operating wavelength for each route in the second step. Along the working route $W_r^k$ the lowest available wavelength is selected as an operating wavelength of a working route, and recorded in $F_r^k$. A set of fibers on which the wavelengths $F_r^k$ is available is recorded in a set $U_r^k$. Similarly, along the 1+1 dedicated backup routes $B_r^{km}$, where 1≤m≤x, the lowest available wavelength are selected as operating wavelengths of backup routes, and recorded in $H_r^{km}$ where 1≤m≤x. A set of fibers on which the wavelengths $H_r^{km}$ where 1≤m≤x is available is recorded in a set $Z_r^{km}$.

For each wavelength w in a fiber q that is confined within fiber cable link 1 connecting nodes $n_l^i$ and $n_l^j$, the ID of all successfully established requests that use the wavelength w for shared protection is recorded in the conflict set $Q_{n_l^i n_l^j}^{qw}$. The shared connections for a request r are found as follows.

For all $r_1 \epsilon Q_{n_l^i n_l^j}^{qw}$, $\forall n_l^i, n_l^j, q, w$, if $W_{r_1}^k$ and $B_{r_1}^{km}$ are fiber cable link disjoint to the found $k^{th}$ working and backup routes, $W_r^k$ and $B_r^{km}$, of request r where 1≤m≤x, then the wavelength w in the $q^{th}$ fiber confined within $1^{th}$ fiber cable connecting nodes i and j can be shared by a request r. Find the number of fiber cables on which a wavelength w can be shared. We refer to this number as a sharing factor of a wavelength. For each $k^{th}$ solution of working and 1+1 dedicated routes, the procedure calculated the sharing factor of each wavelength, selects a wavelength with the maximum sharing factor as an operating wavelength of a route, and records the wavelength in $T_r^{km}$. A set of fiber on which the wavelength $T_r^{km}$ is available is recorded in a set $O_r^{km}$, where 1≤m≤y. The procedure increments the k, and repeats the same process until all K potential solutions are found.

Finally, out of K potential solutions, the procedure selects a solution k' that requires minimum number of new wavelengths. For each wavelength $w=T_r^{k'm}$ on the fibers $q \epsilon O_r^{k'm}$ confined within the fiber cable links $(n_l^i, n_l^j) \epsilon S_r^{k'm}$ of the selected solution k', the request ID r is recorded in the conflict sets $Q_{n_l^i n_l^j}^{qw}$. The found routing solutions can easily be mapped onto the original network G by removing all virtual links along the routes, and mapping virtual nodes to the vertices. The fiber cable link ID represents the ID of a fiber cable. The recorded wavelength and the recorded set of fibers are the operating wavelength and the fibers along the fiber cables.

Figure 2A:
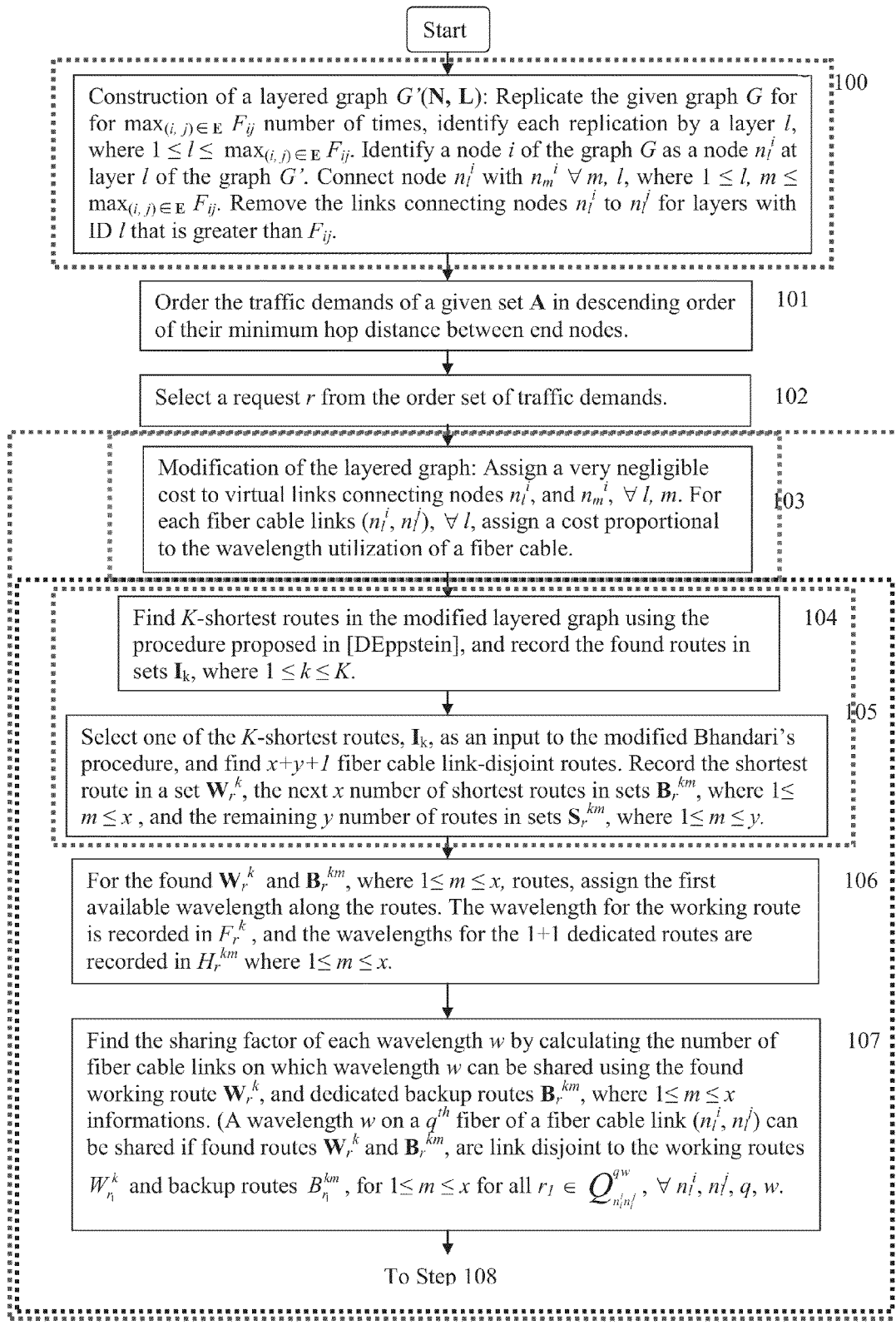
FIGS. 2($a$) and 2($b$) are parts of a flow diagram of the 2-step-optimization procedure, in accordance with the invention.
Figure 2B:
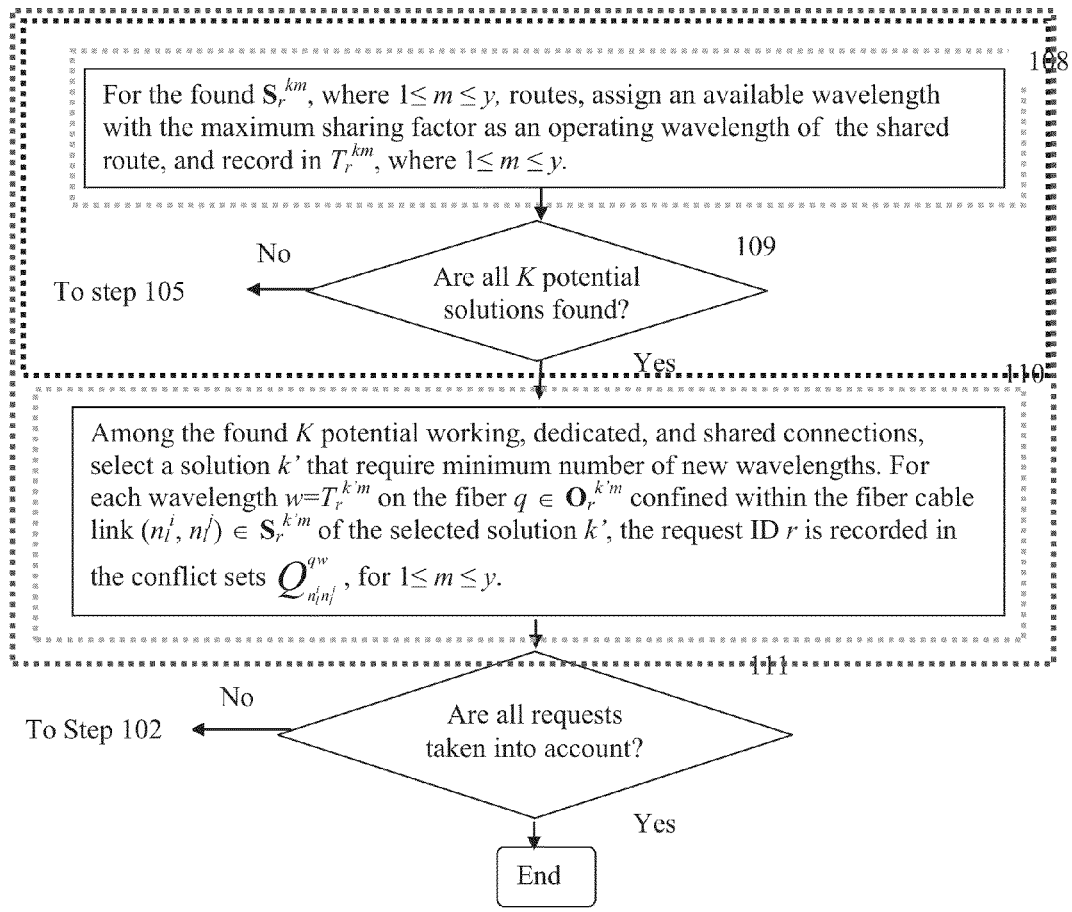

In FIG. 2, we illustrate the flowchart of the 2-step-optimization procedure, and explain as follows At step 100, the procedure constructs a layered graph G'(N, L) from the given graph G(V, E). The procedure replicates the given graph G for $\max_{(i,j) \epsilon E} F_{ij}$ number of times that is the maximum number of fiber cables between any pair of nodes in the given graph. Each replication is identified as a layer l, where $1 \leq l \leq \max_{(i,j) \epsilon E} F_{ij}$, and each node i in the graph G is identified as node $n_l^i$ at layer l of the graph G'. A node i across different layers are connected by establishing a link connecting nodes $n_l^i$ and $n_m^i$, $\forall$ l, m, where 1≤l, m≤$\max_{(i,j) \epsilon E} F_{ij}$. This link $(n_l^i, n_m^i)$, $\forall$ l, m is referred to as a virtual link. A link connecting different nodes within the same layer is denoted as a fiber cable link. The procedure removes all links connecting nodes $n_l^i$ to $n_l^j$ for layers with ID l that is greater than $F_{ij}$. Thus, total number of links connecting nodes $n_l^i$ to $n_l^j$ is equivalent to the number of fiber cables connecting nodes i and j in the given graph G.

At step 101, the procedure orders the given set of requests A in descending order of the minimum hop distance between end nodes. This ordering scheme increases the likelihood of accepting longer requests with wavelength continuity constraints, and also be fair in accommodating longer requests with respect to shorter requests. However, if different fairness levels is required (such as, giving priority to the shortest request to increase total network throughput), this order can be rearranged easily to reflect such fairness requirement (such as sorting the list in ascending order of the minimum hop distance between end nodes).

At step 102, the procedure picks a request r from the sorted pool of requests.

At step 103, the procedure modifies the layered graph by assigning a very negligible cost to all virtual links connecting nodes $n_l^i$, and $n_m^i$, $\forall$ l, m, and assigning a cost proportional to the wavelength utilization of a fiber cable to each fiber cable links $(n_l^i, n_l^j)$, $\forall$ i, j.

At step 104, the procedure finds K-shortest routes in the modified layered graph using an algorithm, and records the found routes in sets $I_k$, where 1≤k≤K. The found routes are not necessarily link-disjoint.

At step 105, the procedure selects one of the K-shortest routes, $I_k$, as an input to the modified Bhandari's procedure, and finds x+y+1 link-disjoint routes. The shortest route is recorded in a set $W_r^k$, the next x shortest routes are recorded in sets $B_r^{km}$, where 1≤m≤x, and the remaining y routes are recorded in sets $S_r^{km}$, where 1≤m≤y. Since working and 1+1 dedicated backup routes require dedicated wavelength resources, selecting shortest routes for working and 1+1 dedicated backup routes minimizes the number of require wavelengths to support a traffic demand.

At step 106, there is an assignment of the first available wavelength along the route $W_r^k$ to the working connection, and records it in $F_r^k$. Similarly, the first available wavelengths along the routes $B_r^{km}$, where 1≤m≤x, are assigned to 1+1 dedicated connections, and recorded in $H_r^{km}$ where 1≤m≤x.

At step 107, the procedure finds the sharing factor of each wavelength w. The sharing factor of a wavelength is defined as the number of fiber cables on which the wavelength can be shared. If found working route $W_r^k$ and dedicated backup routes $B_r^{km}$ of request r are link disjoint to working routes $W_{r_1}^k$ and $B_{r_1}^{km}$ for all $r_1 \epsilon Q_{n_l^i n_l^j}^{qw}$, $\forall n_l^i, n_l^j, q, w$, then the wavelength w on a $q^{th}$ fiber of a fiber cable link $(n_l^i, n_l^j)$ can be shared.

At step 108, the procedure assigns available wavelengths with the maximum sharing factor along the found routes $S_r^{km}$, where 1≤m≤y, to shared connections, and record the wavelengths in $T_r^{km}$, where 1≤m≤y.

At step 109, the procedure checks whether all K potential solutions are found. If the number of potential solutions is less than the K, then the procedure follows step 105, otherwise the procedure follows the step 110.

At step 110, the procedure finds a solution k' out of K potential solution that require minimum number of novel wavelengths. For each wavelength $w=T_r^{k'm}$ on the fibers q $\epsilon O_r^{k'm}$ confined within the fiber cable links $(n_l^i, n_l^j) \epsilon S_r^{k'm}$ of the selected solution k', the request ID r is recorded in the conflict sets $Q_{n_l^i n_l^j}^{qw}$.

At step 111, the procedure checks whether all requests are taken into account. If a solution for any request is still not found, then the procedure follows step 102, otherwise the process is terminated.

Figure 3:
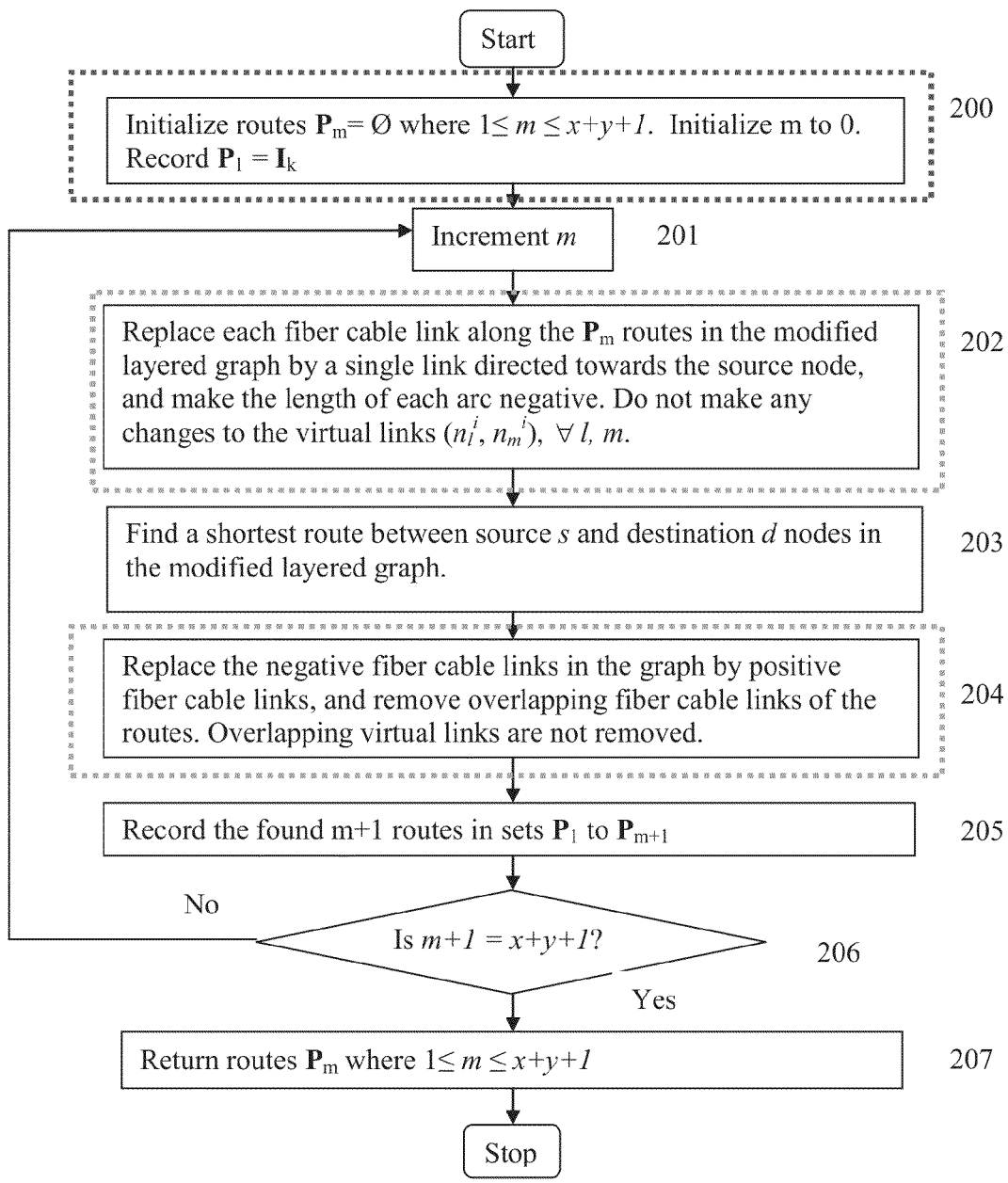
FIG. 3 is a flow diagram of a modified Bhadari's procedure, in accordance with the invention.

In FIG. 3, there is shown a flowchart of the modified Bhandari's procedure, and explained as follows.

At step 200, the procedure initializes a route $P_m$ to an empty set, where 1≤m≤x+y+1. Index m is initialized to 0. The first route $P_1$ is initialized to $I_k$. At step 201, the procedure increments the index m.

At step 202, the procedure replaces each fiber cable link along the $P_m$ routes in the modified layered graph by a single link directed towards the source node, and makes the value of the length of each are negative. Any virtual links $(n_l^i, n_m^i)$, $\forall$ l, m along the routes are not changed. For example, as shown in FIG. 1, the connection between two nodes on different layers is an example of an arc.

At step 203, the procedure finds a shortest route between source s and destination d nodes in the modified layered graph.

At step 204, the procedure replaces the negative length value fiber cable links in the graph by positive length value fiber cable links by taking the absolute value thereof, and removes overlapping or redundant fiber cable links of the routes. Overlapping virtual links are not removed.

At step 205, the procedure records the found m+1 routes in sets $P_1$ to $P_{m+1}$.

At step 206, the procedure checks whether the number of routes found so far is equivalent to x+y+1. If the number of routes is not equivalent to x+y+1, then the procedure follows step 201, otherwise the procedure follows the step 207.

At step 207, the procedure returns the routes $P_m$, where $1 \leq m \leq x+y+1$, and terminated the process.

From the foregoing, it can be appreciated that the present invention provides a procedure that is applicable in network design tools to design survivable networks based on customer requirements. The inventive procedure is fast in that it finds the solution in time that is polynomial of the input size. The inventive procedure is quick, and results a solution in real time. Generalized for any required number of protection paths (any levels of survivability): The inventive procedure addresses the generalized routing and wavelength assignment problem with variable number of 1+1 dedicated and shared connections for the first time. Generalized for multi-cable and multi-fiber networks: The inventive procedure is applicable to multi-fiber networks with any distribution of fibers among given fiber cables. The inventive procedure is resource efficient in that it improves the wavelength utilization of networks. The inventive procedure is flexible in that it allows flexible setting to achieve different fairness levels of network resource utilization.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. For example, those of ordinary skill in the art will recognize that multiple configurations for the optical processing path shown in FIG. 4 are possible to achieve the same signal transformation effect. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for finding a routing and wavelength assignment for a given set of traffic demands requiring variable number of dedicated and shared protections, said method comprising:
    constructing a layered graph responsive to locations of communication nodes and links between the nodes in a network;
    finding a shortest route between source nodes and destination nodes in the network; assigning wavelengths along shared ones of the routes such that sharing of wavelengths is maximized;
    searching from among the assigned wavelengths for potential solutions for routing and wavelength assignment in the network;
    selecting one of the solutions requiring a minimum number of new wavelength links that balance communications in the network; and
    finding a sharing factor of each wavelength, the sharing factor being a number of fiber cables on which the wavelength can be shared wherein if found working routes and dedicated background routes of a traffic request are link disjoint for all traffic requests then the wavelength on a certain fiber of a fiber link can be shared.

2. The computer implemented method of claim 1, wherein the constructing step comprises:
    ordering traffic demands on the network in descending order of their minimum hop distance between end nodes in the network;
    assigning for each fiber cable link in the network a cost proportional to wavelength utilization of a fiber cable; and finding a shortest route by:
    replacing negative fiber cable links in the network by positive fiber cable links and removing overlapping fiber cable links of the routes.

3. The computer implemented method of claim 1, wherein finding the shortest route between source nodes and destination nodes includes initializing a set of routes in the network depicted in the layered graph and replacing each fiber cable link along the routes in the layered graph by a single link directed towards a source node.

4. A system comprising:
    a network of fiber optic nodes and links; and
    a computer with processor and memory for implementing an optimization for finding a routing and wavelength assignment for a given set of traffic demands in the network requiring variable number of dedicated and shared protections, the optimization comprising:
        constructing a layered graph responsive to locations of communication nodes and links between the nodes in a network;
    ordering traffic demands on the network in descending order of their minimum hop distance between end nodes in the network;
        assigning for each fiber cable link in the network a cost proportional to wavelength utilization of a fiber cable;
        finding a shortest route between source nodes and destination nodes in the network;
        replacing negative fiber cable links in the network by positive fiber cable links and removing overlapping fiber cable links of the routes;
        assigning wavelengths along shared ones of the routes such that sharing of wavelengths is maximized; and
        searching from among the assigned wavelengths for potential solutions for routing and wavelength assignment in the network; and
        selecting one of the solutions requiring a minimum number of new wavelength links that balance communications in the network; and
    finding a sharing factor of each wavelength based on the relationship $r_1 \in Q_{n_j^i n_j^j}^{qw}$, $\forall n_l^i, n_l^j, q, w$, where w is the wavelength, $n_l^i, n_l^j$ are $i^{th}$ and $j^{th}$ connecting nodes, q is a fiber within connecting nodes i and j, and for each wavelength w in a fiber q that is confined within fiber cable link l connecting nodes $n_l^i$ and $n_l^j$, the ID of all successfully established requests that use the wavelength w for shared protection is recorded in the conflict set $Q_{n_j^i n_j^j}^{qw}$.

5. The system of claim 1, wherein the optimization comprises finding a sharing factor of each wavelength, the sharing factor being a number of fiber cables on which the wavelength can be shared wherein if found working routes and dedicated background routes of a traffic request are link disjoint for all traffic requests then the wavelength on a certain fiber of a fiber link can be shared.

6. A computer implemented method for finding a routing and wavelength assignment for a given set of traffic demands requiring variable number of dedicated and shared protections, said method comprising the steps of:
- constructing a layered graph responsive to locations of communication nodes and links between the nodes in a network;
- finding a shortest route between source nodes and destination nodes in the network;
- assigning wavelengths along shared ones of the routes such that sharing of wavelengths is maximized; and
- searching from among the assigned wavelengths for potential solutions for routing and wavelength assignment in the network; and
- selecting one of the solutions requiring a minimum number of new wavelength links that balance communications in the network, wherein the optimization comprises finding a sharing factor of each wavelength, the sharing factor being a number of fiber cables on which the wavelength can be shared wherein if found working routes and dedicated background routes of a traffic request are link disjoint for all traffic requests then the wavelength on a certain fiber of a fiber link can be shared.

* * * * *